US010191189B2

(12) United States Patent
Mori et al.

(10) Patent No.: US 10,191,189 B2
(45) Date of Patent: Jan. 29, 2019

(54) OPTICAL LENS, OPTICAL LENS UNIT, AND IMAGING DEVICE

(71) Applicant: KONICA MINOLTA, INC., Chiyoda-ku (JP)

(72) Inventors: Hajime Mori, Fuchu (JP); Dai Akutsu, Inagi (JP); Shinichiro Hara, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/428,288

(22) PCT Filed: Sep. 12, 2013

(86) PCT No.: PCT/JP2013/074701
§ 371 (c)(1),
(2) Date: Mar. 13, 2015

(87) PCT Pub. No.: WO2014/042213
PCT Pub. Date: Mar. 20, 2014

(65) Prior Publication Data
US 2015/0241607 A1    Aug. 27, 2015

(30) Foreign Application Priority Data
Sep. 14, 2012   (JP) ................................ 2012-203116

(51) Int. Cl.
G02B 7/02     (2006.01)
G02B 3/06     (2006.01)
G02B 23/24    (2006.01)

(52) U.S. Cl.
CPC ............. *G02B 3/06* (2013.01); *G02B 23/243* (2013.01)

(58) Field of Classification Search
USPC .................... 359/811, 813, 815, 819–822
See application file for complete search history.

(56) References Cited

U.S. PATENT DOCUMENTS 6,092,728 A *   7/2000   Li ...................... G06K 7/10811
                                                     235/454
7,643,081 B2 *   1/2010   Webster ............... H04N 5/2253
                                                     348/340

(Continued)

FOREIGN PATENT DOCUMENTS

JP     02-066506     3/1990
JP     08-329508    12/1996

(Continued)

OTHER PUBLICATIONS

Office Action dated Nov. 1, 2016 which issued in the corresponding Japanese Patent Application No. 2014-535586.

*Primary Examiner* — Brandi Thomas
(74) *Attorney, Agent, or Firm* — Cozen O'Connor

(57) ABSTRACT

A wide angle optical lens, an optical lens unit, and an imaging device are small-sized and can secure an attachment space even when space is limited, and can avoid adhesion peeling or the extrusion of an adhesive. Optical lens (10) has a lens frame receiving surface (2a) on the side of first optical surface (S1) having a smaller optical surface diameter than second optical surface (S2), and is further provided with an adhesion space forming surface (3a) on the surrounding side of the lens frame receiving surface (2a). Therefore, it is possible to suppress adhesion peeling even when a smaller size is requested. Furthermore, by securing a larger size for lens frame receiving surface (2a), it is possible to suppress leakage or extrusion of adhesive from lens frame receiving surface (2a) and thus adherence to first optical surface (S1).

20 Claims, 8 Drawing Sheets

(56) References Cited

U.S. PATENT DOCUMENTS

| | | | | |
|---|---|---|---|---|
| 2004/0233538 A1* | 11/2004 | Suga | .................. | G02B 23/2461 |
| | | | | 359/614 |
| 2005/0162758 A1* | 7/2005 | Tanaka | .................... | C03B 11/08 |
| | | | | 359/811 |
| 2005/0264898 A1* | 12/2005 | Kuchimaru | ............ | G02B 7/025 |
| | | | | 359/811 |
| 2012/0140336 A1* | 6/2012 | Fujino | ................. | B29C 45/0046 |
| | | | | 359/654 |
| 2012/0314309 A1* | 12/2012 | Tatebayashi | ..... | B29D 11/00413 |
| | | | | 359/819 |

FOREIGN PATENT DOCUMENTS

| | | |
|---|---|---|
| JP | 2001-166192 | 6/2001 |
| JP | 2003-344758 | 12/2003 |
| JP | 2005-156524 | 6/2005 |
| JP | 2005-208330 | 8/2005 |
| JP | 2005-309000 | 11/2005 |
| WO | WO 2009/119192 | 10/2009 |

* cited by examiner

OPTICAL LENS, OPTICAL LENS UNIT, AND IMAGING DEVICE

RELATED APPLICATIONS

This is a U.S. National Phase Application under 35 USC 371 of International Application PCT/JP2013/074701 filed on Sep. 12, 2013.

This application claims the priority of Japanese application no. 2012-203116 filed Sep. 14, 2012, the entire content of which is hereby incorporated by reference.

TECHNICAL FIELD

The present invention relates to a minute and thick optical lens and an optical lens unit, and an imaging device incorporating the lens and the like.

BACKGROUND ART

In recent years, there has been required a minute optical lens and an optical lens unit applicable to, for example, a small-sized device such as a mobile phone and an endoscope, which has an optical fiber or a solid-state imaging element such as CCD (Charge Coupled Device)-type image sensor and a CMOS (Complementary Metal Oxide Semiconductor)-type image sensor. In the assembling of this kind of small lens to a lens frame, it is sometimes difficult to secure an adhesion space because of a spatial limitation, and in this case, it is likely that adhesion peeling or the extrusion of an adhesive is generated.

For securing the adhesion space, there is known a technique of providing a tapered part for the outer circumference of a lens flange part along the optical axis direction (refer to patent literature 1). Furthermore, there is also known a technique of providing an adhesive reservoir portion in the lens frame in order to avoid the adhesion peeling or the extrusion of an adhesive (refer to patent literatures 2 and 3, for example).

However, under a situation in which smaller sizes of the optical lens and the optical lens unit are requested, the peripheral part located outside an optical surface of a lens such as the outer circumference of the flange part is not always sufficiently secured. In the case of, for example, FIG. 2 in the patent literature 1, when the tapered part is provided on the outer circumference of the lens, the adhesion space is secured by making a slope so as to form a shape in which the adhesive reservoir portion spreads as coming closer to a contact part provided for the alignment with the lens frame in the optical axis direction. In this case, the lateral distance between the lens frame and the contact part become small in the direction perpendicular to the optical axis compared with the case where the tapered part is not provided. Accordingly, when applying the shape as in patent literature 1 under the situation in which a smaller size is requested, it becomes difficult to secure a sufficiently large size for the contact part. When the contact part is not sufficiently secured, the adhesive having reached to the contact part from the adhesive reservoir portion might leak or extrude at the time of adhesion.

Furthermore, when the optical lens and the optical lens unit are requested to have smaller sizes, the size of the lens frame is also restricted, and it might become difficult to provide an adhesive reservoir portion having a deformed shape on the lens frame side or the like as in, for example, patent literatures 2 and 3, and to secure a sufficiently large adhesive reservoir portion.

CITATION LIST

Patent Literature

PTL 1: Japanese Patent Laid-Open No. 02-66506
PTL 2: Japanese Patent Laid-Open No. 2001-166192
PTL 3: Japanese Patent Laid-Open No. 08-329508

SUMMARY OF INVENTION

The present invention has been achieved in view of the above problem in the background art, and aims at providing a wide angle optical lens, optical lens unit, and imaging device in which the adhesion space can be secured even under a spatial restriction because of a small size and also the adhesion peeling and the protrusion of an adhesive can be avoided.

In order to achieve the above object, an optical lens according to the present invention is an cylindrical optical lens in which, when an optical surface diameter of a first optical surface on an object side is defined as d1, the optical surface diameter of a second optical surface on an image side is defined as d2, and a lens diameter is defined as D, $d1/d2<0.5$ and also $d2/D>0.9$ are satisfied, and the optical lens includes: a lens frame receiving surface provided on a surrounding side of the first optical surface; and an adhesion space formation part disposed receding from the lens frame receiving surface to a side of the second optical surface, on the surrounding side of the lens frame receiving surface.

The above optical lens is provided with the adhesion space formation part which forms an adhesive reservoir portion and the lens frame receiving surface which is a surface contacting a lens frame, on the side of the first optical surface in which the optical surface diameter is comparatively small, of the first optical surface and the second optical surface, and furthermore the adhesion space formation part is provided on the surrounding side of the lens frame receiving surface. Thereby, even in a case where a smaller size is requested, a large space for the flange is not provided, the flange is not provided, or the like, for example, it is possible to secure a sufficiently large adhesion space formation part and prevent the adhesion peeling, and to secure a sufficiently large lens frame receiving surface and prevent the adhesive having entered the adhesion space formation part from leaking or protrusion from the lens frame receiving surface.

Furthermore, as to this optical lens, it is not necessary to provide an adhesion space on the side of the second optical surface having a comparatively large optical surface diameter, on the surrounding or outer side, and thus the second optical surface can be provided across a region closer to the lens diameter. Accordingly, it is possible to design a small size and wide angle lens.

Moreover, it is possible to secure an adhesion space without providing an adhesive reservoir portion having, for example, a deformed shape on the lens frame side when the optical lens is assembled to the lens frame, by including the adhesion space formation part provided being dented toward the second optical surface.

In a specific aspect or viewpoint of the present invention, the lens frame receiving surface is provided perpendicularly to an optical axis and in a ring-belt or circular-zone shape around the first optical surface. In this case, since the lens frame receiving surface can be formed simultaneously with the lens optical surface, it is possible to obtain the lens frame receiving surface having a ring-belt shape precisely perpendicular to the optical axis. The first optical surface can make contact with the lens frame across the whole circumference by being set to have the shape like this, and thus it is possible to avoid the situation in which the adhesive leaks or protrudes to the first optical surface side from a gap in the lens frame receiving surface.

In another aspect of the present invention, the lens diameter D satisfies 0.1 mm≤D≤1.0 mm. In this case, the lens to be targeted has a small size, in particular, and can be applied as lenses for imaging devices of the mobile phone or for an endoscope.

In still another aspect of the present invention, the adhesion space formation part is formed by a first step surface provided on the surrounding side of the lens frame receiving surface and a second step surface provided on the surrounding side of the first step surface. In this case, it is possible to secure an adhesive reservoir pool by the second step surface, while preventing the leakage or protrusion of the adhesive and preventing the adhesive from entering the lens frame receiving surface by the first step surface, of the two stage step surfaces.

In still another aspect of the present invention, the first step surface forms a shallower step than the second step surface in the adhesion space formation part. In this case, it is possible to cause the adhesive not to enter easily but to enter to some extent by making the first step surface shallower, and thus it is possible to prevent the adhesive from entering the lens frame receiving surface and also to obtain a sufficiently strong adhesion state by securing a large adhesion area.

In still another aspect of the present invention, the first step surface has a step of 0.001 mm or more and 0.020 mm or less. In this case, it is possible to secure the state where the adhesive does not enter the first step surface easily but enter the first step surface to some extent. Specifically, by setting the step within this range, it becomes easy to cause the adhesive having entered the adhesion space formation part to spread across the whole circumference so as to close the circumference.

In still another aspect of the present invention, when the lens diameter is defined as D and the on-axis lens thickness is defined as L, 0.5≤D/L≤2.0 is satisfied. In this case, it is possible to prevent size increase while securing aberration correction, by providing a lower limit for D/L which defines the lateral size with respect to the longitudinal size, and it is possible to secure an adhesion space in the assembling, by providing an upper limit for D/L.

In still another aspect of the present invention, when the lens edge thickness is defined as L0, and the on-axis lens thickness is defined as L, 0.1≤L0/L≤0.7 is satisfied. In this case, it is possible to secure a necessary optical performance even if the lens is small-sized, by keeping the edge thickness within a certain range with respect to the longitudinal size.

In still another aspect of the present invention, when the gate thickness is defined as g and the lens edge thickness is defined as L0, 0.1≤L0/g≤1.2 is satisfied. In this case, since the gate thickness comes close to the edge thickness or becomes sufficiently larger than the edge thickness, it is possible to secure a preferable state of fluidity of material in a mold part forming a gate part and releasability at the time of the molding.

In still another aspect of the present invention, the first optical surface is a convex surface or flat surface, and the second optical surface is a convex surface. In this case, it is possible to keep necessary performance by setting the first optical surface to be the convex surface or the flat surface in accordance with the use. When the optical lens is used, for example, in water by setting the first optical surface to be a flat surface, it is possible to maintain resolution states in air and in water under equivalent conditions.

In still another aspect of the present invention, the optical lens is a lens produced by resin molding. In this case, it is possible to form the adhesion space formation part easier than in the case of glass, and to produce the adhesion space formation part more inexpensively than in the case of glass.

In still another aspect of the present invention, the optical lens is a lens produced by injection molding.

An optical lens unit according to the present invention includes: the above optical lens; a lens frame which makes contact with the lens frame receiving surface of the optical lens and houses the optical lens in a state where an adhesive reservoir portion is formed by the adhesion space formation part; and an adhesion part which enters the adhesive reservoir portion provided between the adhesion space formation part provided on the surrounding side of the lens frame receiving surface and the lens frame, and which causes the optical lens and the lens frame to adhere to each other. Through the use of the optical lens of the present invention, it is possible to obtain a small-sized optical lens unit in which optical performance is secured to the extent capable of being used for the mobile phone or the endoscope, while preventing the adhesion peeling and the extrusion of an adhesive to the optical surface even if the lens is small-sized.

In a specific aspect or viewpoint of the present invention, when the lens diameter of the optical lens is defined as D and a diameter of the lens frame is defined as Dk, Dk/D≤1.5 is satisfied. In this case, the optical lens unit becomes suitable to the use for an imaging device of the endoscope.

In another aspect of the present invention, when the diameter of the lens frame is defined as Dk, Dk is 1.5 mm or less. In this case, when the optical lens unit is applied to the imaging device for the endoscope, the optical lens unit can be used for an elongated endoscope such as, in particular, a folloposcope or salpingoscope for oviduct.

An imaging device according to the present invention includes the above optical lens unit and an imaging element which receives light from the optical lens unit. Through the use of the optical lens unit of the present invention, it is possible to make even a small-sized optical imaging device into a wide-angle imaging device and also obtain an imaging device in which the necessary performance can be secured.

In a specific aspect or viewpoint of the present invention, the imaging device can be applied as an imaging device for the endoscope. In this case, although a small-sized imaging device is required, by applying the above imaging device, a wide-angle imaging device is obtained even if the imaging device is small-sized and also the necessary optical function is secured, and it is possible to obtain an endoscope having high performance in photographing.

DESCRIPTION OF EMBODIMENTS

First Embodiment

Figure 1:
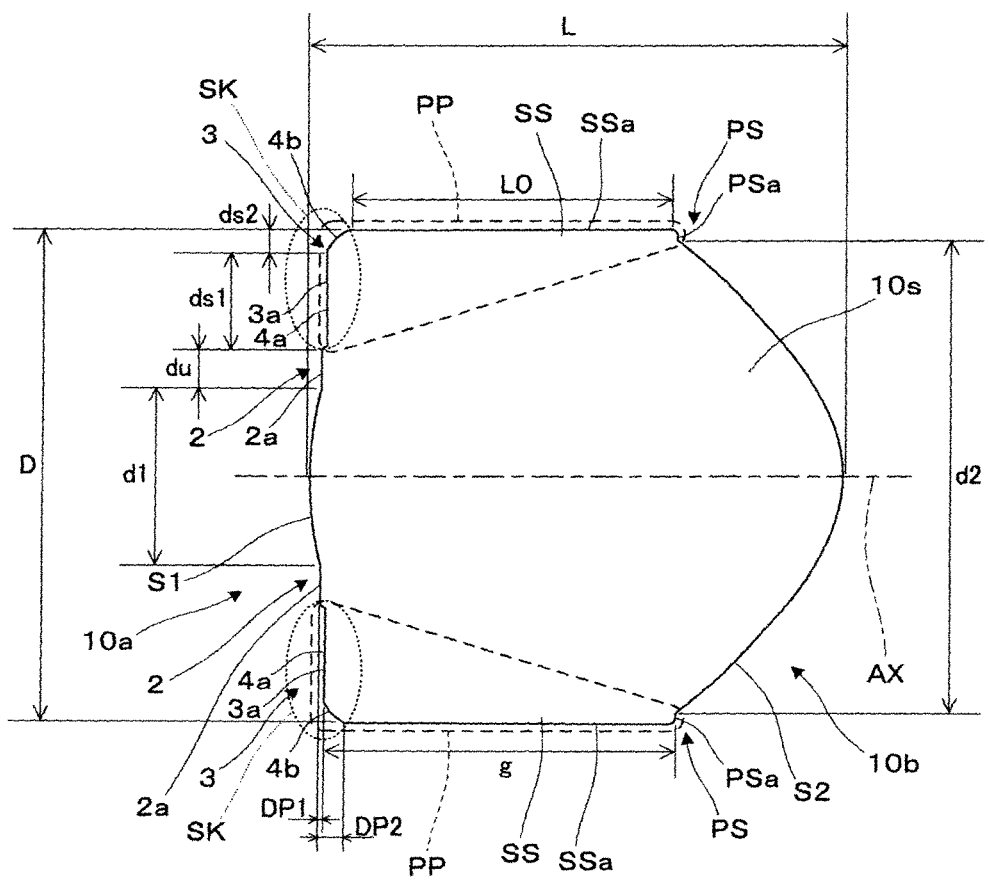
FIG. 1 is a diagram for explaining an optical lens according to a first embodiment of the present invention.
Figure 2A:
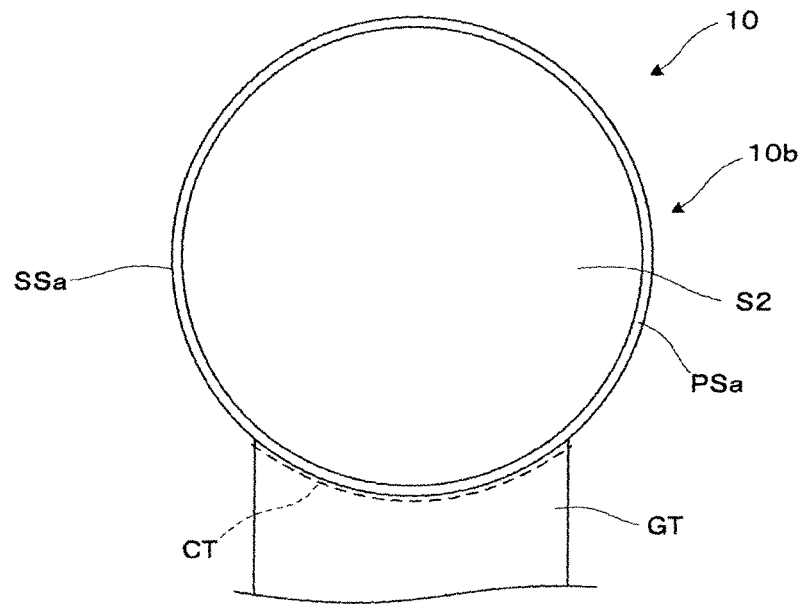
FIG. 2A is a plan view of an optical lens before cutting.
Figure 2B:
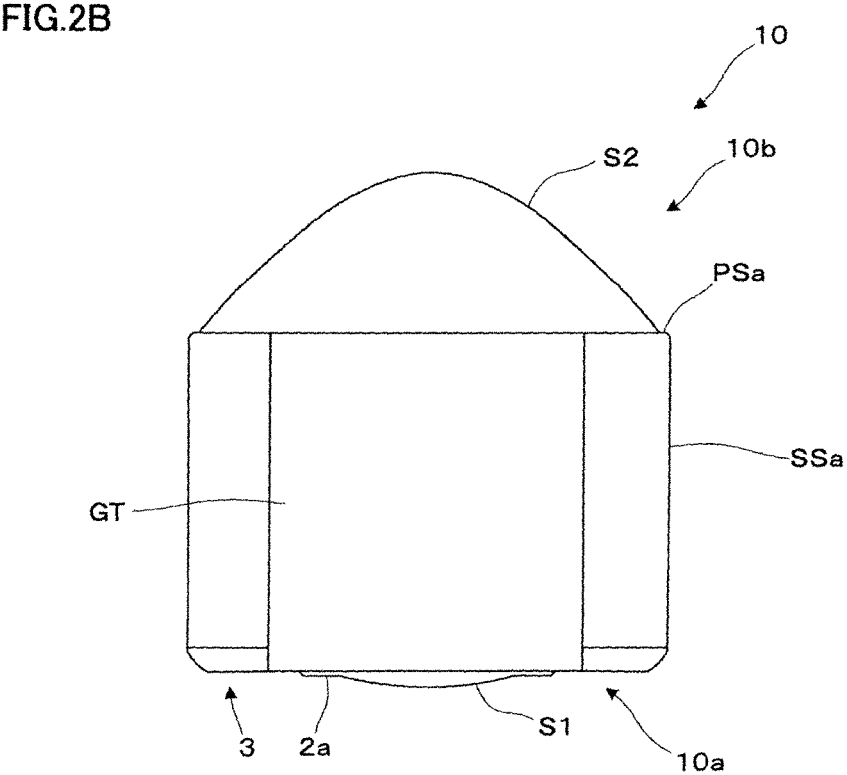
FIG. 2B is a side view thereof.

FIG. 1 is a side cross-sectional view for explaining an optical lens according to a first embodiment of the present invention. The optical lens 10 of the present embodiment is a single lens which can function as an imaging lens, and is a small-sized lens capable of being mounted on a small size imaging device built in, for example, a mobile phone, an endoscope, or the like. The optical lens 10 has a rotationally-symmetrical shape as a whole in a columnar shape having an optical axis AX at the center axis (excluding a gate part). Furthermore, as shown in FIGS. 2A and 2B, the optical lens 10 is obtained by cutting apiece or material resin-molded through injection mold along, for example, a cylindrical cutting surface CT in a gate part GT. Note that, as to the shape of the cutting surface CT, various shapes can be employed depending on the structure of a lens frame to which the optical lens 10 is to be attached.

Returning to FIG. 1, in the optical lens 10, a main body part 10s which is a center side part where the optical axis AX passes through and has an optical function, and a peripheral part PP which is a cylindrical part formed around the main body part 10s and is utilized for alignment and fixing are formed in an integrated manner.

The optical lens 10 as a whole includes a first surface 10a which is an object side surface, a second surface 10b which is the image side surface, and an outer side surface SSa of a side part extending along the optical axis direction, and the external appearance shape is formed by these surfaces. Among these surfaces, the first surface 10a is formed by a first optical surface S1 that is located on the center side extending around the optical axis AX and is an optical surface on the object side having a circular contour, an annular lens frame receiving surface 2a disposed on the surrounding side or the outer side of the first optical surface S1, and an annular adhesion space forming surface 3a disposed on the surrounding side or the outer side of the lens frame receiving surface 2a. On the other side, the second surface 10b is formed by a second optical surface S2 that is located on the center side extending around the optical axis AX and is an optical surface on the image side having a circular contour, and an annular peripheral surface PSa disposed on the surrounding side or the outer side of the second optical surface S2. Note that each of the first optical surface S1 and the second optical surface S2 which are surfaces performing the optical function is a surface that is rotationally symmetric around the optical axis AX, with a surface perpendicular to the optical axis AX as a reference. Furthermore, the diameter of the first surface 10a on the object side including the first optical surface S1 and the diameter of the second surface 10b on the image side including the second optical surface S2 coincide or approximately coincide with each other. That is, the outer side surface SSa of the optical lens 10 has a cylindrical surface shape.

In the optical lens 10, the main body part 10s is a part on the center side through which the optical axis AX passes and is a part contributing directly to the optical function, and among the above surfaces, the optical lens 10 includes the first optical surface S1 and the lens frame receiving surface 2a of the first surface 10a and the second optical surface S2 of the second surface 10b. Here, in the main body part 10s, an annular part including the lens frame receiving surface 2a having a lateral width of du is referred to as a lens frame reception part 2. Furthermore, here, the second optical surface S2 is a surface having a comparatively larger optical surface than the first optical surface S1 when making a comparison between the first optical surface S1 and the second optical surface S2.

On the other side, the peripheral part PP in the optical lens 10 is a part on the surrounding side apart from the optical axis AX and a part without being directly involved in the optical function, and among the above surfaces, the peripheral part PP includes the adhesion space forming surface 3a of the first surface 10a, the outer side surface SSa, and the peripheral surface PSa of the second surface 10b. Here, in the peripheral part PP, an annular part including the adhesion space forming surface 3a is referred to as an adhesion space formation part 3, a cylindrical part including the outer side surface SSa is referred to as an outer side surface part SS, and an annular part including the peripheral surface PSa is referred to as a peripheral surface part PS. Furthermore, in the peripheral part PP, a part which is constituted, for example, of the adhesion space formation part 3 and a part connected to the adhesion space formation part 3 in the outer side surface part SS, and which makes contact with adhesive at the time of fixing is referred to as an adhesion part SK. The peripheral part PP is not involved in the optical function, but performs an important role in alignment and fixing when the optical lens 10 is attached to another member. In particular, the adhesion part SK is a part directly involved when fixing the optical lens 10.

Note that the optical lens 10 is a cylinder having a constant or approximately constant diameter as a whole, and a pair of side surface parts have an approximately parallel shape in the cross sectional view of the drawing. In the optical lens 10, the main body part 10s has a shape expanding from the first surface 10a toward the second surface 10b, whereas the peripheral part PP has a triangular shape tapering off from the first surface 10a toward the second surface 10b.

In this optical lens 10, the optical surface diameter of the first optical surface S1 is defined as d1, the optical surface diameter of the second optical surface S2 is defined as d2, and the lens diameter (maximum diameter) of the optical lens 10 is defined as D. For example, when the outer side surface SSa forms a perfect cylindrical surface shape, both of the diameters of the first surface 10a and the second surface 10b completely coincide with the lens diameter D. As an example of a specific numerical value, the lens diameter D is 0.1 mm≤D≤1.0 mm. In this case, the optical lens 10 is a small-sized lens and suitable for the application to the endoscope, and can be applied to an imaging device for, in particular, a folloposcope having an elongated shape.

Furthermore, in this optical lens 10, the following relationship is satisfied as to the optical surface diameter d1 and the like.

d1/d2<0.5, and also d2/D>0.9

As above, d1/d2<0.5 is satisfied as to the optical surface diameter. Namely, in the optical lens 10, the size of the first optical surface S1 that is an optical surface on the object side is as small as not more than a half of the diameter of the second optical surface S2 that is an optical surface on the image side. Thereby, the optical lens 10 can be configured to provide the lens frame receiving surface 2a around or outside of the first optical surface S1, and furthermore can be configured to provide the adhesion space forming surface 3a around or outside of the lens frame receiving surface 2a, in the first surface 10a on the object side. Moreover, as d1/d2 is smaller, light goes in the expansion direction and a wide angle optical system can be achieved. On the other side, d2/D>0.9 is satisfied as above. That is, in the optical lens 10, the second optical surface S2 occupies the most of the second surface 10b on the image side, and except for the second optical surface S2, only the peripheral surface PSa which does not have the optical function is formed in a small peripheral part. As d2/D is closer to 1, light passes through the lens to the extreme limit of the outer shape, and a smaller diameter lens can be configured for the same optical path. As described above, the optical lens 10 can be designed so as to realize a comparatively wide angle even for a small size.

Note that, in the example of the drawing, each of the first optical surface S1 and the second optical surface S2 is a convex surface, that is, is assumed to be a lens having refractive power to some extent.

Figure 3A:
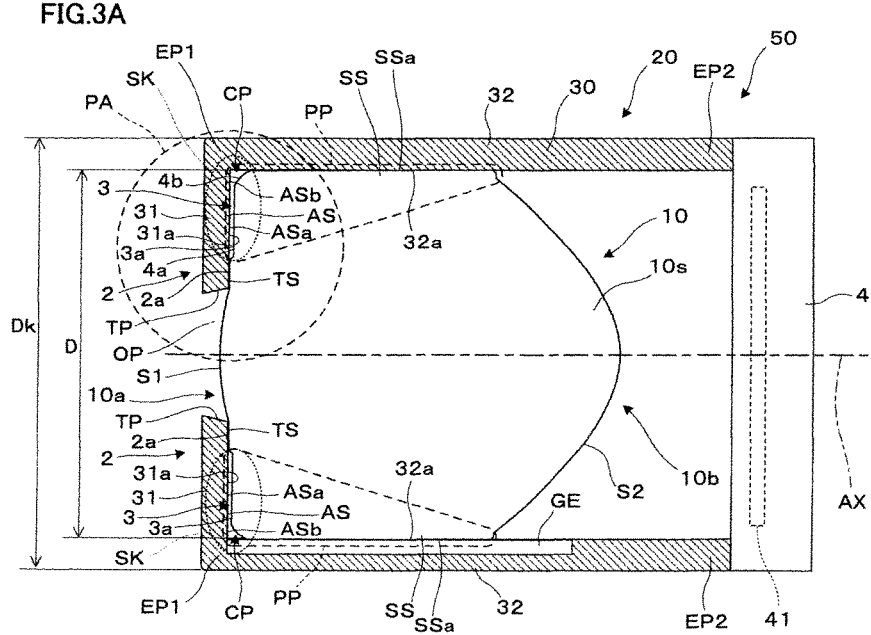
FIG. 3A is a diagram for explaining an imaging device obtained by assembling the optical lens of FIG. 1.

In the lens frame reception part 2, the lens frame receiving surface 2a is provided having a belt-ring shape around the first optical surface S1, and is a flat surface perpendicular to the optical axis AX. For example, as shown in FIG. 3A, the lens frame receiving surface 2a makes contact with another member such as a lens frame 30 in the attachment, and thus the lens frame reception part 2 functions as an alignment part. Furthermore, the lens frame receiving surface 2a is a surface protruding most around the first optical surface S1, and, by bringing the lens frame receiving surface 2a into close contact with the lens frame or the like, it is possible to prevent the adhesive from protruding to the inside first optical surface S1 from the outside of the lens frame receiving surface 2a during the adhesion.

The adhesion space formation part 3 is a part for forming an adhesive reservoir portion which is a region pooling the adhesive when the optical lens 10 is attached to a member such as the lens frame, and the adhesion space forming surface 3a is disposed receding from the lens frame receiving surface 2a to the side of the second optical surface S2. In other words, the lens frame receiving surface 2a protrudes from the adhesion space forming surface 3a to the side of the first optical surface S1. Thereby, while details will be described below, as shown in FIG. 3A and the like, for example, in bringing the lens frame receiving surface 2a into contact with the lens frame 30, an adhesive reservoir portion CP is formed by the adhesion space formation part 3.

Furthermore, the adhesion space forming surface 3a that is a surface part of the adhesion space formation part 3 has a two-stage step structure formed by a first step surface 4a which is provided on the surrounding side of the lens frame receiving surface 2a and has a lateral width ds1, and a second step surface 4b which is provided on the surrounding side of the first step surface 4a and has a lateral width ds2. In particular, the first step surface 4a is configured to form a shallower step than the second step surface 4b. Namely, the first step surface 4a recedes by a length or depth DP1 from the lens frame receiving surface 2a to the side of the second optical surface S2 in the optical axis direction, whereas the second step surface 4b recedes from the lens frame receiving surface 2a by a length or depth DP2 (>DP1) at a maximum. Here, for example, the length DP1 is assumed to be 0.001 mm or more and 0.020 mm or less. Namely, the first step surface 4a forms a step of 0.001 mm or more and 0.020 mm or less. By setting the step on the first step surface 4a in this range, the state where the adhesive does not easily enter but is allowed to enter to some extent is secured. Note that, as to the length DP2 defining the step by the second step surface 4b and the shape of the second step surface 4b, it is possible to appropriately perform design so as to secure a sufficiently large size for pooling the adhesive and for preventing the adhesive from spreading in an unintended direction. Here, as an example, the second step surface 4b is formed by rounding the end part of the adhesion space forming surface 3a. The adhesion space formation part 3 is configured to include the adhesion space forming surface 3a having the above two-stage step structure, and thus it is possible to secure an adhesion area for making the adhesion state sufficiently strong, while securing a sufficiently large adhesive reservoir pool and preventing the adhesive from leaking or protruding by restricting the adhesive entering the lens frame receiving surface 2a, in attaching the optical lens 10 to another member by adhesion. Note that it is possible to use, for example, an ultraviolet curing epoxy resin or an ultraviolet curing acryl resin as the adhesive, and in this case, it is possible to cause the optical lens 10 to adhere to another member by hardening the adhesive by ultraviolet light irradiation. Furthermore, it is also possible to use a thermosetting adhesive.

As described above, the optical lens 10 is positioned in the attachment to another member by the lens frame receiving surface 2a which has a ring-belt or circular-zone shape and is provided around the first optical surface S1 that is an optical surface on the object side, and at this time, since the adhesive region is secured by the adhesion space formation part 3 provided on the surrounding side of the lens frame receiving surface 2a, it becomes possible to prevent the adhesive from leaking or protruding to the first optical surface S1, while maintaining a preferable adhesion state even for a small-sized lens in the attachment by adhesion.

Here, as shown in FIG. 1, in the optical lens 10, when the on-axis thickness of the optical lens in the direction parallel to the optical axis AX is defined as L, it is preferable to satisfy $0.5 \leq D/L \leq 2.0$ for the lens diameter D. In this case, it is possible to prevent the increase in the size while making the aberration correction easy by preventing off-axis light passing through the second optical surface S2 from moving away from the optical axis AX, by providing a lower limit for D/L which defines the size in the lateral direction (direction in a plane perpendicular to the optical axis AX) to the size in the vertical direction (optical axis direction), and it is possible to secure a sufficiently large surface diameter difference between the optical surfaces S1 and S2, and to secure an adhesion space in the attachment of the optical lens 10, by providing an upper limit for D/L.

Furthermore, when the edge thickness is defined as L0, it is preferable to satisfy $0.1 \leq L0/L \leq 0.7$. In this case, by setting the edge thickness in a certain range with respect to the size of the optical lens 10, in the vertical direction (optical axis direction), it is possible to realize a state where the necessary optical performance is secured even when the optical lens 10 has a small size. Note that the smaller edge thickness L0 is advantageous in the viewpoint of securing the adhesion space.

Furthermore, when the gate thickness is defined as g, it is preferable to satisfy $0.1 \leq L0/g \leq 1.2$. In this case, since the gate thickness g can be made closer to the edge thickness L0 or can be sufficiently larger than the edge thickness L0, it is possible to secure fluidity of the resin material and releasability at the time of the molding under preferable conditions, at the mold section forming the gate part GT when producing an injection molded article as shown in FIGS. 2A and 2B.

Figure 3B:
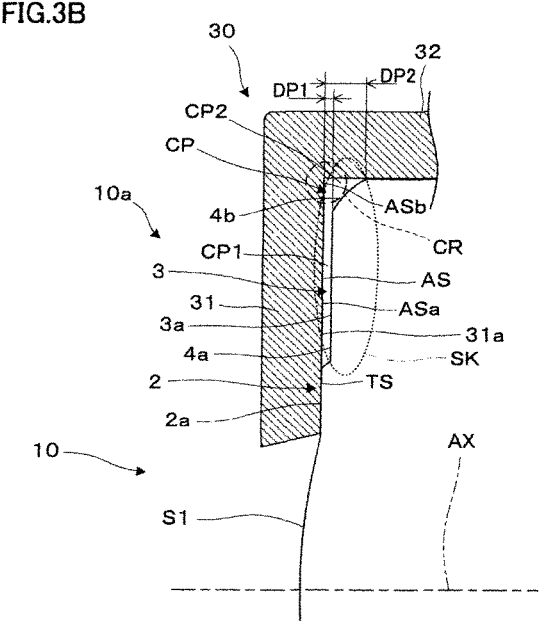
FIG. 3B is a partially enlarged view of FIG. 3A.

Hereinafter, there will be explained an example of an optical lens unit and an imaging device including the above optical lens 10. FIG. 3A is a diagram showing an imaging device 50 constituted of an optical lens unit 20 including the optical lens 10 of FIG. 1, and FIG. 3B is a partially enlarged diagram showing a part of a region PA in FIG. 3A. The imaging device 50 is provided with the optical lens unit 20 obtained by assembling the optical lens 10, and an imaging unit 40 constituted including an imaging element 41. Namely, the imaging device 50 is constituted by combining the optical lens unit 20 and the imaging unit 40.

The optical lens unit 20 includes the above optical lens 10, the lens frame 30 holding the optical lens 10. The lens frame 30 is a cylindrical body, one end of which is opened, and includes an attachment part 31 which is provided for contacting and attaching the optical lens 10 extending in a radial direction, and a cylindrical side part 32 extending in the optical axis AX direction so as to hold the optical lens 10 from surrounding. The attachment part 31 is a disk-like (ring-belt shape) member having a hole in the center. More specifically, the attachment part 31 is disposed at one of the ends of the cylindrical side part 32 having a cylindrical shape in the optical axis direction and is a part forming the side of a first end part EP1 which is one end part (object side end part) of the cylindrical lens frame 30. The attachment part 31 includes an inner circumference surface 31a that is a surface on the inner surface side when viewed as the lens frame 30 and includes a contact part TS with the optical lens 10, and a tip end surface TP that is a surface of the minimum diameter end and defines the shape of an opening part OP serving as the hole provided in the center. More specifically, the opening part OP is disposed on the center side in which the optical axis AX is centered, and is defined by the tip end surface TP of the attachment part 31, thereby being configured to have a shape according to the contour shape of the first optical surface S1 of the optical lens 10. Furthermore, the attachment part 31 can hold the optical lens 10 while maintaining a state where the first optical surface S1 is exposed on the object side via the opening part OP, by bringing the contact part TS of the inner circumference surface 31a into contact with the lens frame receiving surface 2a in the first surface 10a of the optical lens 10. Moreover, a non-contact part AS of the inner circumference surface 31a of the attachment part 31, on the surrounding side of the contact part TS forms the adhesive reservoir portion CP together with the adhesion space forming surface 3a, in a state where the lens frame receiving surface 2a and the contact part TS make contact with each other.

The cylindrical side part 32 includes an inner circumference side surface 32a having a cylindrical shape, extending along the outer side surface part SS of the optical lens 10 in a storage state where the inner circumference surface 31a of the attachment part 31 is caused to face the first surface 10a. The cylindrical side part 32 supports the optical lens 10 from the side surface side by the inner circumference side surface 32a, and performs the alignment with respect to a direction perpendicular to the optical axis AX or the side direction. Furthermore, the cylindrical side part 32 includes a gas-escaping part GE formed by a groove extending in the optical axis direction, in a part of the inner circumference side surface 32a. The gas-escaping part GE prevents gas from remaining in the adhesive reservoir portion CP at the time of the adhesion of the optical lens 10, and it is possible to prevent the adhesive from flowing in the unexpected direction.

From different points of view, the above lens frame 30 performs the alignment and fixing relative to the optical lens 10 by the peripheral part PP of the optical lens 10.

The imaging unit 40 incorporates the imaging element 41 such as CCD and CMOS. As shown in the drawing, the imaging unit 40 is provided facing the second optical surface S2, on the side of a second end part EP2 which is the other end part (image side end part) disposed on the side opposite to the first end part EP1 where the optical lens 10 is assembled, of the end parts EP1 and EP2 of the lens frame 30.

The imaging device 50 having a configuration as described above functions as an imaging device imaging an external state by causing external light to enter from the first optical surface S1 that is an optical surface on the object side in the optical lens 10, and by causing the imaging unit 40 to receive the light emitted from the second optical surface S2 after having passed through the inside of the optical lens 10.

Hereinafter, there will be explained a structural part related with the fabrication of the optical unit 20, that is, the assembling of the optical lens 10 to the lens frame 30, in the imaging device 50. As shown partially enlarged in FIG. 3B, the adhesion space forming surface 3a formed on the surrounding side of the first surface 10a is formed by the above first step surface 4a and second step surface 4b. Accordingly, the adhesive reservoir portion CP that is a space for the adhesive is formed by two-stages of a first reservoir portion CP1 and a second reservoir portion CP2, when the lens frame receiving surface 2a is brought into contact with the attachment part 31. Specifically, the first reservoir portion CP1 that is a comparatively narrow or shallow region is formed by the first step surface 4a of the optical lens 10 and a first part ASa that is a part of the non-contact part AS in the inner circumference surface 31a of the lens frame 30, and the second reservoir portion CP2 that is a comparatively wide or deep region is formed by the second step surface 4b and a second part ASb that is a remaining part of the non-contact part AS in the inner peripheral surface 31a. The first reservoir portion CP1 is formed as a step having depth (0.001 mm or more and 0.020 mm or less) corresponding to the length DP1 in the first step surface 4a. Furthermore, the second reservoir portion CP2 is formed corresponding to the shape or the maximum length DP2 of the second step surface 4b.

Figure 4A:
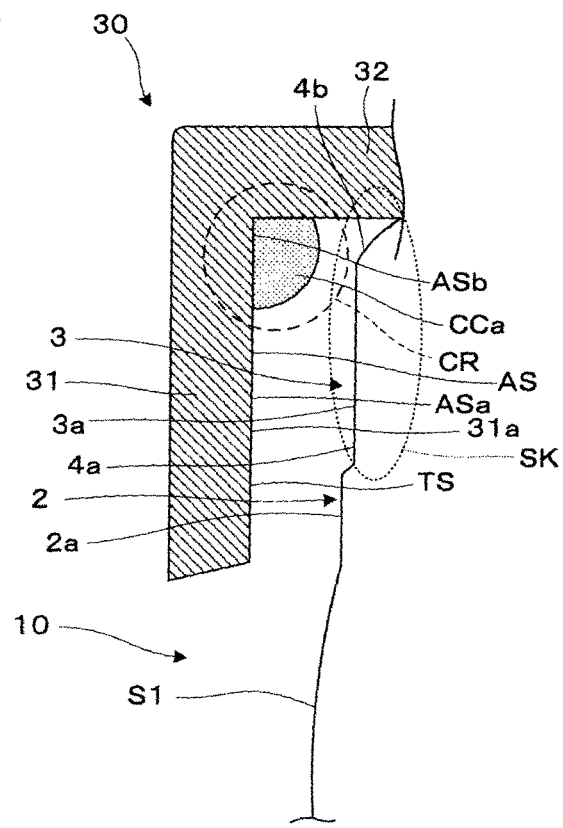
FIG. 4A is a diagram showing a state just before optical lens adhesion.
Figure 4B:
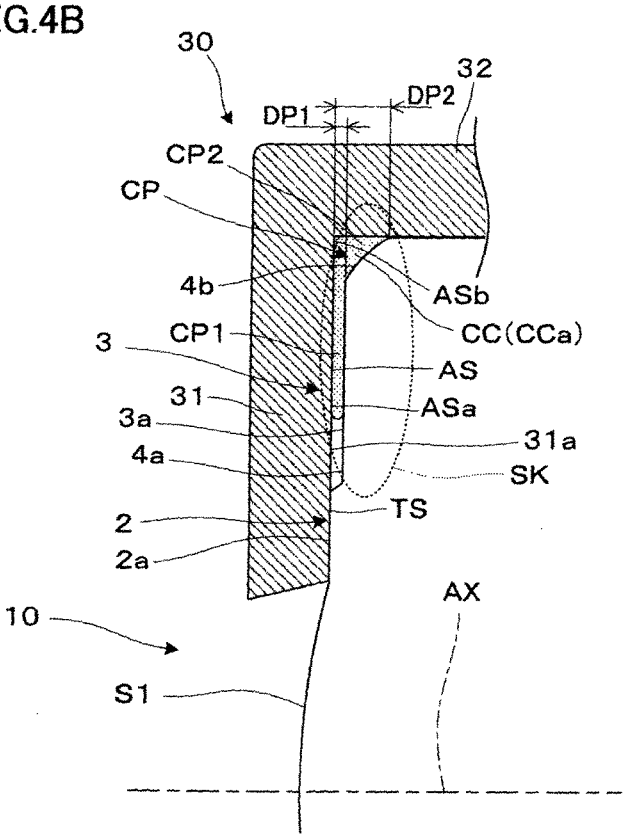
FIG. 4B is a diagram showing a state after the optical lens adhesion.

Hereinafter, there will be shown an example of the assembling of the optical lens 10 to the lens frame 30, that is, the adhesion action. FIG. 4A is a diagram showing an example of a state just before the adhesion of the optical lens 10, and FIG. 4B is a diagram showing a state after the adhesion of the optical lens 10. First, in the example shown in FIG. 4A, the adhesive CCa is coated on a corner surface part CR that is a part where the adhesive reservoir portion CP inside the lens frame 30 is formed. Next, the optical lens 10 is inserted inside from the side of the second end part EP2 (refer to FIG. 3A) that is an end on the opened side of the lens frame 30. After that, as shown in FIG. 4B, the lens frame receiving surface 2a of the optical lens 10 is brought into contact with the inner circumference surface 31a of the lens frame 30, and the optical lens 10 is caused to adhere, by pushing the optical lens 10 along the optical axis AX. At this time, a part of the adhesive CCa extends to enter the first reservoir portion CP1 that is formed by the first step surface 4a and the inner circumference surface 31a, and the remaining of the adhesive CCa stays in the second reservoir portion CP2 formed by the second step surface 4b and the inner circumference surface 31a. Since the first reservoir portion CP1 formed by the insertion of the optical lens 10 into the lens frame 30 is sufficiently narrow as described above, the amount of a part of the adhesive CCa entering the first reservoir portion CP1 is limited and is configured not to reach a contact position between the lens frame receiving surface 2a and the contact part TS of the inner circumference surface 31a. Furthermore, even if the case where a part of the adhesive CCa extends along the first reservoir portion CP1 occurs, the lens frame receiving surface 2a makes contact with the contact part TS of the lens frame 30 in a close adherence state and functions as an adhesion stopper, and the adhesive CCa is prevented from extending toward the first optical surface S1. As shown in FIG. 4B, the adhesive CCa is hardened in a state of being sandwiched between the non-contact part AS of the inner circumference surface 31a and the adhesion part SK of the optical lens 10, and thus an adhesion part CC is formed and the optical lens 10 is assembled to the lens frame 30. Note that, when the adhesive CCa is, for example, an ultraviolet curable resin, the hardened adhesion part CC is formed by the irradiation with ultraviolet light and the optical lens unit 20 is produced.

As above, the optical lens 10 according to the present embodiment is provided with the adhesion space forming surface 3a forming the adhesive reservoir portion CP on the side of the first optical surface S1 having a comparatively small optical surface diameter among the first optical surface S1 and the second optical surface S2, and the lens frame receiving surface 2a that is brought into contact with the lens frame 30, and furthermore the adhesion space forming surface 3a is provided on the surrounding side of the lens frame receiving surface 2a. Thereby, even when a smaller size is requested and an optical element in which, for example, the flange cannot be made large or the flange is not provided is assembled, it is possible to secure a sufficiently large adhesion space and to prevent the adhesion peeling. Furthermore, it is possible to secure a sufficiently large size for the lens frame receiving surface 2a and prevent the adhesive CCa having entered the adhesion space forming surface 3a from being leaked or protruded from the lens frame receiving surface 2a to thereby adhere to the first optical surface S1. Furthermore, the optical lens unit 20 obtained by assembling the optical lens 10 can be applied to various optical devices in which a smaller size is requested.

Figure 5:
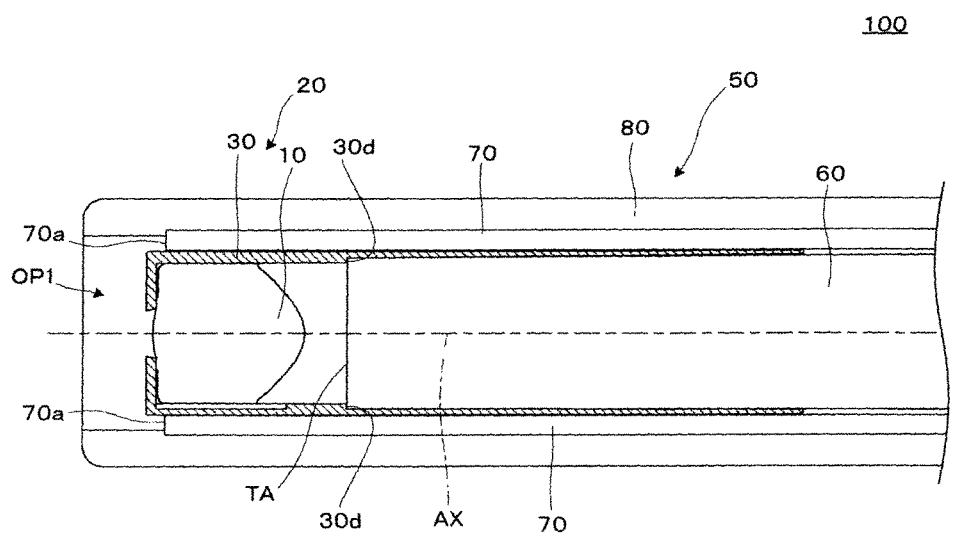
FIG. 5 is a diagram showing an example of an endoscope provided with an imaging device.

FIG. 5 is a diagram showing an endoscope 100 as an example of an optical device to which the imaging device 50 including the optical lens unit 20 is applied. In FIG. 5, the endoscope 100 is provided with: the optical lens unit 20 constituted of the optical lens 10 and the lens frame 30; an image fiber 60 which is constituted by bundling many optical fibers, which makes the light from the optical lens 10 incident from one end part Ta to propagate, and which thus performs image transmission; an illumination fiber 70 which is an illumination system disposed on the periphery of these components; and a sheath 80 which is further disposed on the peripheral side and covers the whole for protection. Note that, although the imaging device 50 is constituted of the above optical lens unit and the image fiber 60, the imaging device 50 can be constituted including an imaging unit and the like (not shown in the drawing), for example, on the side of the other end part of the image fiber 60, that is, on the operation side. In addition, the lens frame 30 is provided with a step part 30d for aligning and fixing the end part TA of the image fiber 60 to an imaging position of the optical lens 10. Furthermore, the sheath 80 is provided with an opening OP1 on the object side, and enables irradiation with illumination light from the light emission end 70a of the illumination fiber 70 to the object side and also enables reflected light or observation light to enter into the optical lens 10. Note that the endoscope 100 may be constituted to include a medical tool or the like other than the above. Moreover, although the endoscope 100 includes a control device for performing various kinds of processing controls on an image signal or the like from the imaging device 50 on the other end side of the image fiber 60, illustration and explanation are omitted here.

Note that, while the illumination fiber 70 is assumed to be applied as the illumination system in the above, the illumination system can be constituted to carry out illumination by guiding light from, for example, an external light source provided on the side of the non-illustrated control device, various light sources can be applied to the illumination system, and the use of, for example, an LED light source is possible.

In addition, while the above is an example of the application of the imaging device 50 to the endoscope, for example, the imaging device 50 can be applied in various modes in which the endoscope 100 includes a solid-state imaging element such as CCD or CMOS on the top or distal side as a part of the imaging device 50 and transmits a signal by a cable or the like.

Furthermore, the imaging device 50 is not limited to the imaging device of the endoscope 100 as described above, but can be applied to, for example, the imaging device of a mobile phone or the like. Moreover, the optical lens unit 20 obtained by assembling the optical lens 10 is not limited to the case of the above endoscope constituted by using the image fiber and the like, but can be applied also to various types of endoscopes other than the above endoscope.

As to the imaging device 50, when the diameter of the lens frame 30 is defined as Dk, it is possible to satisfy $Dk/D \le 1.5$ for the lens diameter D of the optical lens 10. In this case, it becomes suitable for the use of an imaging device incorporated in the endoscope. In particular, when the lens diameter D satisfies $0.1 \text{ mm} \le D \le 1.0 \text{ mm}$, Dk becomes 1.5 mm or less. In this case, in the application to the imaging device for the endoscope, it becomes possible to apply the device particularly to an elongated endoscope such as a folloposcope.

Second Embodiment

Hereinafter, there will be explained an optical lens, an optical lens unit, and an imaging device according to a second embodiment. Note that the optical lens and the like according to the present embodiment is a modification of the optical lens 10 and the like according to the first embodiment. The other structures excluding a part thereof are the same as in the case of the first embodiment, and explanation will be omitted as to a portion excluding the part of the structure.

Figure 6:
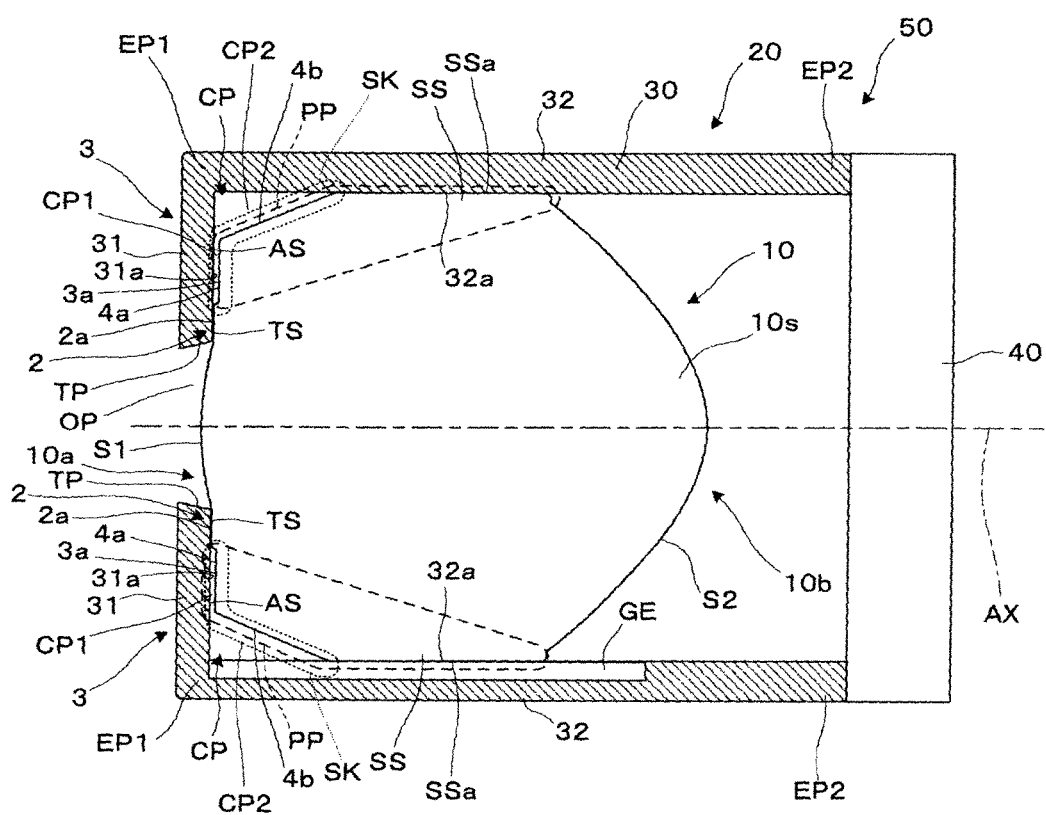
FIG. 6 is a diagram for explaining an imaging device obtained by assembling an optical lens according to a second embodiment of the present invention.

FIG. 6 is a side cross-sectional view for explaining the imaging device obtained by assembling the optical lens according to the second embodiment of the present invention.

As shown in the drawing, in the present embodiment, the shape of the peripheral part PP of the optical lens 10 is different in the imaging device 50 constituted of the optical lens unit 20 including the optical lens 10. More specifically, in the adhesion part SK of the peripheral part PP, the second step surface 4b, among the first step surface 4a and the second step surface 4b of the adhesion space forming surface 3a, is constituted to be cut out to have a slope shape.

Namely, while the second step surface 4b is formed by being rounded in the first embodiment, the second step surface 4b has a slope shape in the second embodiment, and it is possible to obtain a larger size for the second reservoir portion CP2 in the adhesive reservoir portion CP by appropriately adjusting the size of this slope, for example, that is, it is possible to obtain a larger adhesion space. Note that when the size of the second step surface 4b is made larger, the outer side surface part SS of the peripheral part PP becomes relatively smaller than in the case of the first embodiment.

Also in the case of the present embodiment, even when a smaller size is requested, it is possible to secure a sufficiently large adhesion space and prevent the adhesion peeling. In addition, it is possible to secure a sufficiently large size for the lens frame receiving surface 2a and prevent the adhesive from leaking or protruding from the lens frame receiving surface 2a to thereby stick to the optical lens 10. Furthermore, the optical lens unit 20 obtained by assembling the optical lens 10, and eventually the imaging device 50 can be applied to various apparatuses in which a smaller size is requested. In particular, in the case of the present embodiment, it is possible to more definitely secure a necessary adhesion space by the shape of the optical lens 10.

Third Embodiment

Hereinafter, there will be explained an optical lens, an optical lens unit, and an imaging device according to a third embodiment. Note that the optical lens or the like according to the present embodiment is a modification of the optical lens 10 and the like according to the first embodiment, and the other structures excluding a part thereof are the same as in the case of the first embodiment, and explanation will be omitted as to a portion excluding the part of the structure.

Figure 7:
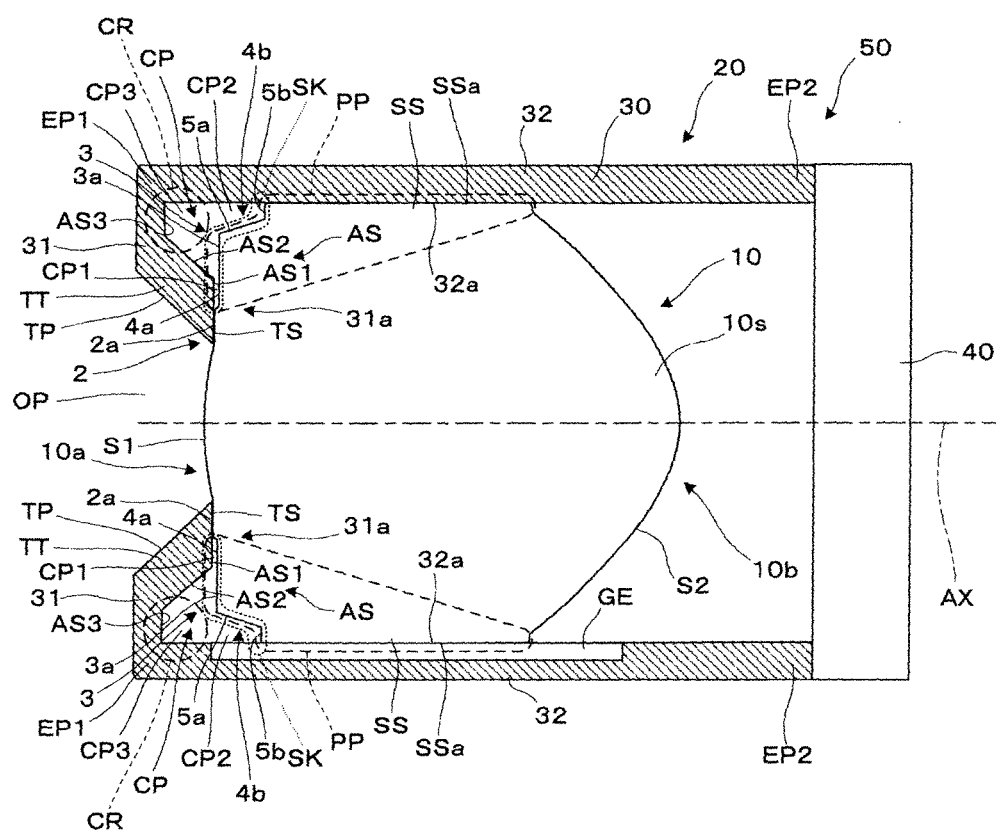
FIG. 7 is a diagram for explaining an imaging device obtained by assembling an optical lens according to a third embodiment of the present invention.

FIG. 7 is a side cross-sectional view for explaining the imaging device obtained by assembling the optical lens according to the third embodiment of the present invention.

As shown in the drawing, in the present embodiment, the shape of the peripheral part PP of the optical lens 10 is different in the imaging device 50 constituted of the optical lens unit 20 including the optical lens 10. Furthermore, the shape of the attachment part 31 of the lens frame 30 is different. In the case of the present embodiment, since the shape of the adhesion part SK of the peripheral part PP is different from the case of the first embodiment, it becomes possible not only to secure a region of the second reservoir portion CP2 of the adhesive reservoir portion CP, but also to form a new third reservoir portion CP3 as a part of the adhesive reservoir portion CP on the side of the lens frame 30 because of a different shape of the attachment part 31.

Hereinafter, first the shape of the peripheral part PP of the optical lens 10 will be explained. In the case of the present embodiment, the second step surface 4b, among the first step surface 4a and the second step surface 4b of the adhesion space forming surface 3a, has a step shape formed by two surface parts in the adhesion space formation part 3 of the peripheral part PP. More specifically, the second step surface 4b is constituted of a slope surface part 5a as a first partial surface and a flat surface part 5b as a second partial surface. Among these surfaces, the slope surface part 5a is a surface connected to the first step surface 4a, and is a tapered surface inclined with respect to the optical axis AX. The flat surface 5b is a surface connected to the slope surface part 5a and is a flat surface perpendicular to the optical axis AX. The second step surface 4b is constituted of the slope surface part 5a and the flat surface part 5b to thereby have a step shape, and enables the formation of the second reservoir portion CP2 having a sufficiently large depth. In this case, it is possible to allow the second reservoir portion CP2 to have a comparatively large capacity by appropriately adjusting the slope of the slope surface part 5a.

Next, the shape of the attachment part 31 of the lens frame 30 will be explained. In the case of the present embodiment, as shown in the drawing, the inner circumference surface 31a has a step shape in the attachment part 31. More specifically explained, the inner circumference surface 31a is constituted of the contact part TS which is a flat surface part making contact with the lens frame receiving surface 2a of the optical lens 10 and the non-contact part AS which does not make contact with the lens frame receiving surface 2a, and the non-contact part AS has a step shape. Furthermore specifically, the non-contact part AS is constituted of a first part AS1 which is a flat surface part connected to the contact part TS, a second part AS2 which is a tapered surface part connected to the first part AS1 and inclined with respect to the optical axis AX, and a third part AS3 which is a flat surface part connected to the second part AS2. As shown in the drawing, the second part AS2 and the third part AS3 of the non-contact part AS has a shape protruding to the object side or the observation side from the contact position between the contact pert TS of the lens frame 30 and the lens frame receiving surface 2a of the optical lens 10, and thus the new reservoir portion CP3 is constituted as apart of the adhesive reservoir portion CP at the corner surface part CR of the lens frame 30.

Note that the tip end surface TP of the attachment part 31 is inclined with respect to the optical axis AX and has a tapered surface. The shape of the opening part OP is defined by the appropriate adjustment of the angle of this tip end surface TP. In the case of the present embodiment, from different points of view, it can also be said that a tip end part TT which is a portion of the distal end side and includes the tip end surface TP has a shape of biting into the inner side of the lens frame 30. Then, there arises a problem in which the first optical surface S1 of the optical lens 10 exposed from the optical lens unit 20 is put into a state of receding to the inner side of the lens frame 30 and external light might not be taken in sufficiently. However, it is possible to avoid such a situation by appropriately adjusting the taper angle of the tip end surface TP which is the above tapered surface.

According to the present embodiment, even when a smaller size is requested, it is possible to secure a sufficiently large space for adhesion and to prevent adhesion peeling. In addition, it is possible to secure a sufficiently large size for the lens frame receiving surface 2a and to prevent the adhesive from leaking or protruding from the lens frame receiving surface 2a to thereby stick to the optical lens 10. Furthermore, the optical lens unit 20 obtained by assembling the optical lens 10, and eventually the imaging device 50 can be applied to various apparatuses in which a smaller size is requested. In particular, in the case of the present embodiment, it is possible to secure the adhesion space more definitely, by enabling the formation of a step part not only in the shape of the optical lens 10, but also in the shape of the lens frame 30. Moreover, in this case, since the new third reservoir portion CP3 can be formed by deforming the attachment part 31 of the lens frame 30 in the optical axis direction without increasing the diameter of the lens frame, it is possible to avoid the increase in the diameter of the whole imaging device 50.

Others

Figure 8:
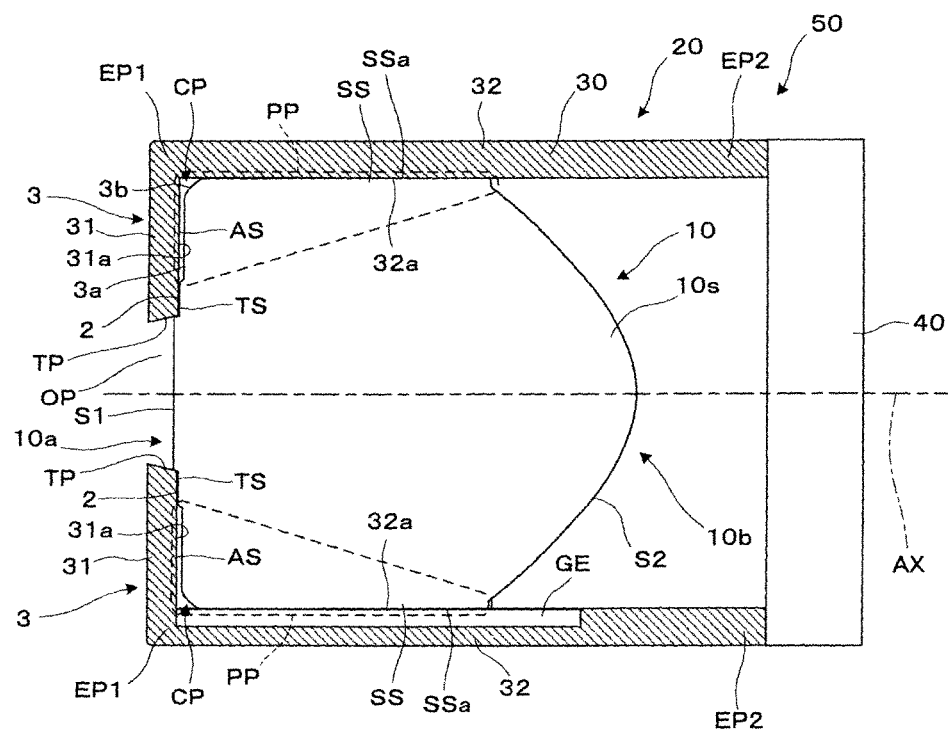
FIG. 8 is a diagram for explaining another example of an imaging device obtained by assembling an optical lens.

FIG. 8 is a diagram explaining another example of the imaging device 50 obtained by assembling the optical lens 10, and the first optical surface S1 which is an object side lens may not be a convex surface but a flat surface or an approximately flat surface. For example, when the imaging device 50 is used in water, the refractive index of a medium is different from that in the case of the air. Therefore, it is possible to suppress the influence of image distortion or the like caused by a difference in the refractive index, by setting the first optical surface S1 to be a flat surface without having refractive power or to be an approximately flat surface having a week refractive power.

In addition, while the above first embodiment explains the case where each of the diameters of the first surface 10a and the second surface 10b coincides with the lens diameter D, the outer side surface SSa is not required to have a perfect cylindrical surface shape in the outer side surface part SS of the optical lens 10, and a bit of taper or the like may be formed, if the optical lens 10 can be assembled to the lens frame or the like. For example, the diameters of the first surface 10a and the second surface 10b may not completely coincide with each other and the diameter of the first surface 10a may be slightly smaller than the diameter of the second surface 10b, or the like.

Furthermore, although, in the above, the lens frame receiving surface 2a of the lens frame reception part 2 is defined to be a flat surface in order to function as an alignment surface, the lens frame reception part 2 including the lens frame receiving surface 2a may have a structure excluding the flat surface in order to determine an alignment position.

Moreover, although, in the above, the length DP1 is defined to be 0.001 mm or more and 0.020 mm or less, the length DP1, that is, the depth of the step formed by the first step surface 4a can be appropriately modified depending on viscosity or the like of the adhesive CCa to be used.

In addition, although, in the above, the optical lens 10 is constituted of a single lens, a plurality of lenses can be combined.

Furthermore, in a case where a space can be secured on the side of the lens frame 30, an adhesive reservoir pool may be provided further on the side of the lens frame 30.

Moreover, although, in the above, the adhesion part SK is defined to be a part which is constituted of the adhesion space formation part 3 and the adjacent part connected to the adhesion space formation part 3 in the outer side surface part SS and is a part making contact with the adhesive when the optical lens 10 is fixed, the position for the adhesion needs not be restricted as to a part on the outer side, for example, and various modes are considered to be possible. Without influence on the optical function, the adhesion may be carried out to the side of the peripheral surface part PS across the outer side surface part SS for example.

The invention claimed is:

1. An optical lens having a cylindrical shape, wherein, when an optical surface diameter of a first optical surface on an object side is defined as d1, the optical surface diameter of a second optical surface on an image side is defined as d2, and a lens diameter is defined as D, d1/d2<0.5 and also d2/D>0.9 are satisfied, the optical lens comprising:
 a lens frame receiving surface provided on a surrounding side of the first optical surface; and
 an adhesion space formation lens portion disposed receding from the lens frame receiving surface to a side of the second optical surface, on the surrounding side of the lens frame receiving surface,
 wherein the adhesion space formation lens portion is formed by a first step surface provided on the surrounding side of the lens frame receiving surface and a second step surface provided on the surrounding side of the first step surface, and the second step surface is not perpendicular to the first step surface.

2. The optical lens according to claim 1, wherein the lens frame receiving surface is provided perpendicularly to an optical axis and in a ring-belt shape around the first optical surface.

3. The optical lens according to claim 1, wherein the lens diameter D satisfies 0.1 mm≤D≤1.0 mm.

4. The optical lens according to claim 1, wherein the first step surface forms a shallower step than the second step surface in the adhesion space formation lens portion.

5. The optical lens to claim 1, wherein the first step surface has a step of 0.001 mm or more and 0.020 mm or less.

6. The optical lens according to claim 1, wherein, when the lens diameter is defined as D and an on-axis lens thickness is defined as L, 0.5≤D/L≤2.0 is satisfied.

7. The optical lens according to claim 1, wherein, when a lens edge thickness is defined as L0, and the on-axis lens thickness is defined as L, 0.1≤L0/L≤0.7 is satisfied.

8. The optical lens according to claim 1, wherein, when a gate thickness is defined as g and the lens edge thickness is defined as L0, 0.1≤L0/g≤1.2 is satisfied.

9. The optical lens according to claim 1, wherein the first optical surface is a convex surface or a flat surface, and the second optical surface is a convex surface.

10. The optical lens according to claim 1, wherein the optical lens is a lens produced by resin molding.

11. The optical lens according to claim 10, wherein the optical lens is a lens produced by injection molding.

12. An optical lens unit, comprising:
 the optical lens according to claim 1;
 a lens frame which makes contact with the lens frame receiving surface of the optical lens and houses the optical lens in a state where an adhesive reservoir portion is formed by the adhesion space formation lens portion; and
 an adhesion part which enters the adhesive reservoir portion provided between the adhesion space formation lens portion provided on the surrounding side of the lens frame receiving surface and the lens frame, and which causes the optical lens and the lens frame to adhere to each other.

13. The optical lens unit according to claim 12, wherein, when the lens diameter of the optical lens is defined as D and a diameter of the lens frame is defined as Dk, Dk/D≤1.5 is satisfied.

14. The optical lens unit according to claim 12, wherein, when the diameter of the lens frame is defined as Dk, Dk is 1.5 mm or less.

15. An imaging device, comprising:
 the optical lens unit according to claim 12; and
 an imaging element which receives light from the optical lens unit.

16. The imaging device according to claim 15, which can be applied as an imaging device for an endoscope.

17. The optical lens according to claim 1, wherein the second step surface is formed by rounding an end part of the adhesion space formation lens portion, or the second step surface has a slope shape surface which is inclined outwardly toward the second optical surface.

18. The optical lens according to claim 17, wherein the second step surface is formed by rounding the end part of the adhesion space formation lens portion.

19. The optical lens according to claim 17, wherein the second step surface is the slope shape surface.

20. The optical lens according to claim 17, wherein the second step surface has a slope surface part as the slope shape surface.

\* \* \* \* \*